(No Model.) 3 Sheets—Sheet 2.
A. H. & P. E. TESCHNER.
HARROW.
No. 479,476. Patented July 26, 1892.
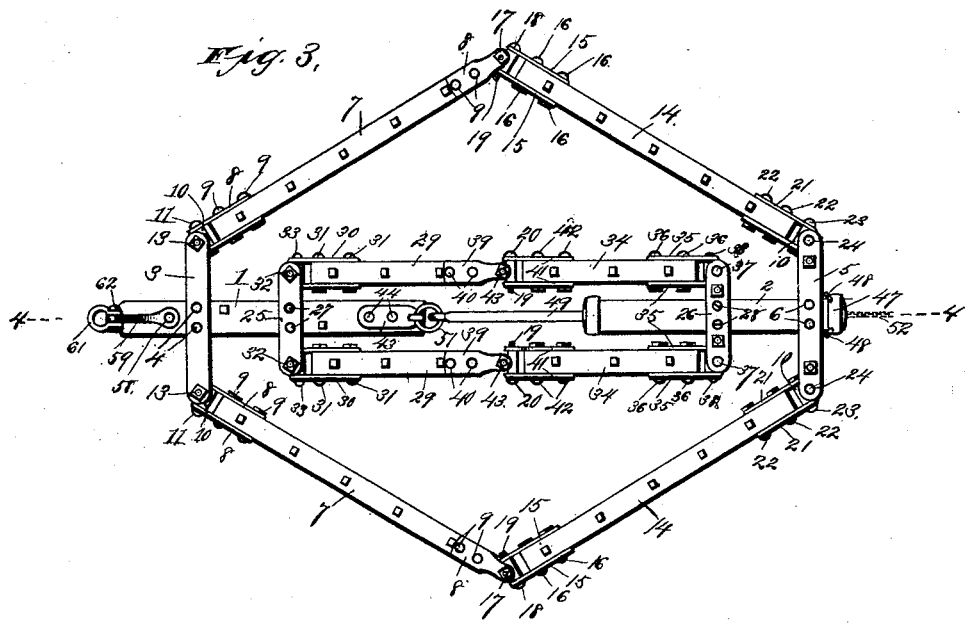
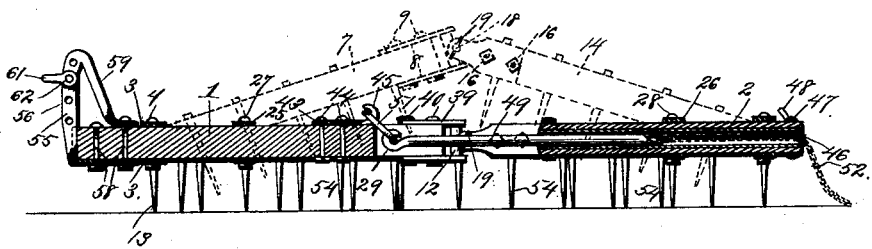
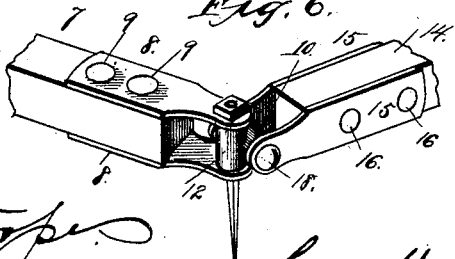
Witnesses:
Inventors
A. H. Teschner and
P. E. Teschner,
per Higdon and Higdon
attys.

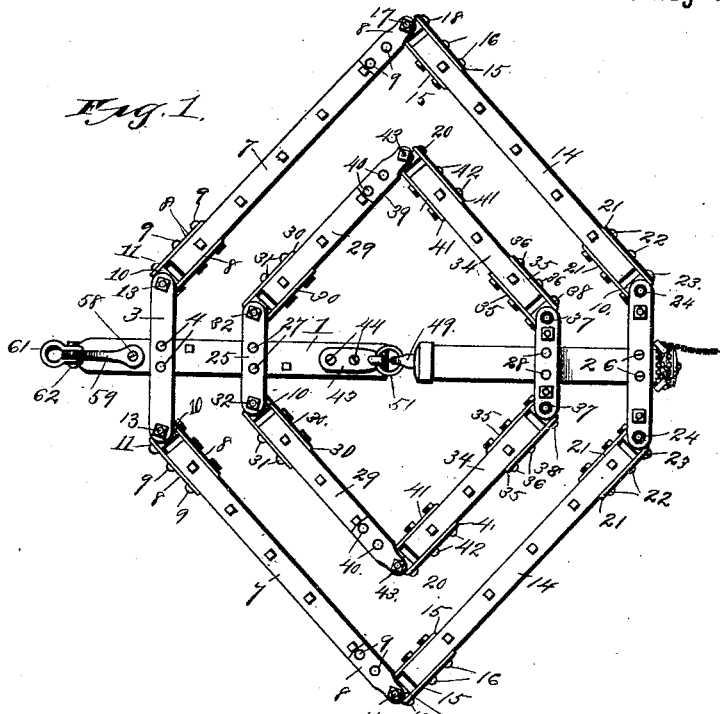

(No Model.) 3 Sheets—Sheet 3.
A. H. & P. E. TESCHNER.
HARROW.
No. 479,476. Patented July 26, 1892.
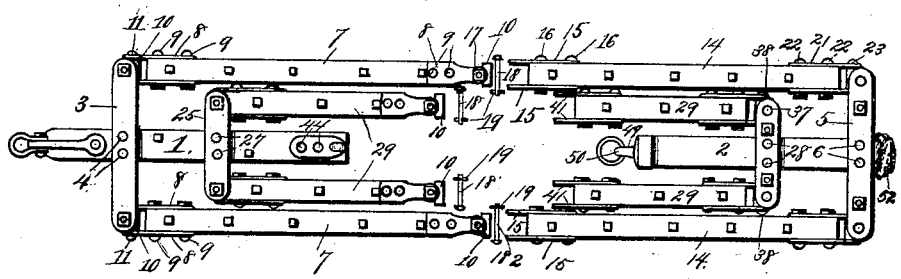
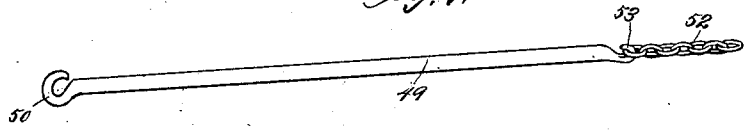
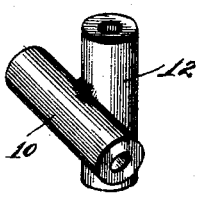
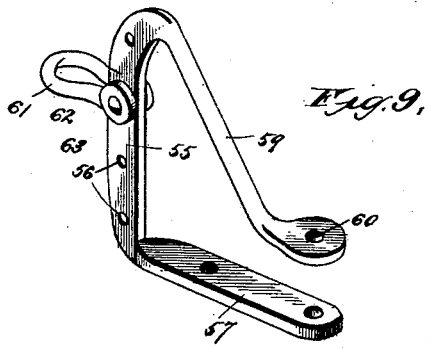
Witnesses:
Inventors.
A. H. Teschner and
P. E. Teschner
per Higdon and Higdon
atty's

UNITED STATES PATENT OFFICE.

AUGUST H. TESCHNER AND PAUL E. TESCHNER, OF ATCHISON, KANSAS.

HARROW.

SPECIFICATION forming part of Letters Patent No. 479,476, dated July 26, 1892.

Application filed December 10, 1891. Serial No. 414,611. (No model.)

*To all whom it may concern:*

Be it known that we, AUGUST H. TESCHNER and PAUL E. TESCHNER, of Atchison, Atchison county, Kansas, have invented certain new and useful Improvements in Harrows, of which the following is a full, clear, and exact description, reference being had to the accompanying drawings, forming a part hereof.

Our invention relates to that class of agricultural implements which are designed to be drawn over the ground to level it, to stir the ground, destroy weeds, or cover seed; and the object of our invention is to produce a harrow which shall be simple, strong, durable, and comparatively inexpensive in construction and very rapid and effective in its operation.

A further object of our invention is to produce a harrow which, in addition to the advantages above specified, shall possess great flexibility, so as to conform readily to all inequalities of the surface of the ground, and consequently utilize all of its teeth under all conditions. Furthermore, to produce a harrow which shall be readily extensible longitudinally and contractible laterally, so as to automatically clear itself from contact with stumps, rocks, and similar obstructions, thereby preventing injury of the harrow teeth or frame by violent contact of said parts with such obstructions.

A still further object of our invention is to produce a harrow of the type above specified the parts of which shall be readily detachable, so as facilitate the shipment or storage of the harrow.

To the above purposes our invention consists in certain peculiar and novel features of construction and arrangement, as hereinafter described and claimed.

In order that our invention may be fully understood, we will proceed to describe it with reference to the accompanying drawings, in which—

Figure 1 is a plan view of a harrow constructed in accordance with our invention, the harrow-frame being in its normal operative position. Fig. 2 is an inverted or under side plan view of the same, showing the relative positions of the harrow-teeth during the usual operation of the harrow. Fig. 3 is a plan view of the harrow extended longitudinally and contracted laterally, as when passing a stump or other obstruction. Fig. 4 is a vertical longitudinal section of the harrow on the line 4 4 of Fig. 3. Fig. 5 is a plan view of the harrow with its two sections detached from each other in order to adapt the harrow for shipment or storage. Fig. 6 is a detached perspective view of the adjacent ends of two of the bars of the harrow-frame, showing the attachments for connecting the same. Fig. 7 is a detached perspective view of one of the double pivot-sockets for the harrow-sections. Fig. 8 is a detached perspective view of the sliding draft-rod and its chain for connecting the two sections of the harrow-frame. Fig. 9 is a detached perspective view of the draft-clevis. Fig. 10 is a detached perspective view of one of the detachable pins of the harrow-frame and its linchpin.

In the said drawings, 1 designates the center bar of the front section of the harrow-frame, and 2 designates the center bar of the rear harrow-frame section. These two bars are of any suitable length and width, and are preferably formed of squared timbers, although they may obviously be of metal, if preferred, and the said bars extend longitudinally of the frame at the middle thereof, and are, furthermore, preferably, although not necessarily, of equal length. At the front end of the front center bar 2 are bolted two cross-bars 3, which are preferably of metal and which extend transversely of the said bar. One of these cross-bars rests upon the top of the center bar 1, and the other cross-bar is located immediately beneath the under side of said center bar, and said cross-bars are secured in position by two through-bolts 4, which pass vertically through the center bar and through the middle of the cross-bars. At the rear end of the rear center bar 2 are located two cross-bars 5, which are also preferably of metal and which extend transversely of said center bar. One of these cross-bars 5 rests upon the upper side of the center bar 2, and the other cross-bar is located immediately beneath the said center bar through bolts 6, which pass vertically through the center bar 2 and the cross-bars 5, serving as the means for attaching the cross-bars to the center bar.

7 designates two elongated bars, which are preferably squared timbers, but which may be metal bars, if preferred, and each of which is pivotally attached at its front end to the outer ends of the two cross-bars 3, the means for so attaching said bars 7 being as follows: To the two opposite vertical sides of the bars 7 at each end thereof are secured two metal plates 8, two or more through-bolts 9, with their usual nuts, serving as the means for securing the plates in position. Between the projecting ends of the front pair of plates 8 is located the horizontal member 10 of a double tubular swivel, (which is most clearly shown in Figs. 6 and 7,) a horizontal bolt 11 passing through the said member and through the projecting ends of the arms 8. The double swivel is composed of two members 10 and 12, which are preferably in the form of an integral metal casting and which extends at right angles to each other, as shown, said members being united to each other midway of their length, so that the swivel is of approximately X form. The vertical member 12 of each of these front swivels is located between the projecting ends of the front cross-arms 3, a vertical bolt 13 passing loosely through said vertical member and also through the ends of the cross-arms 3, the bolts 13 being prolonged downward, so as to form teeth for the harrow, as shown.

14 designates two bars, which are similar in respect to dimensions and material of construction to the bars 7, above described. At their front ends these bars 14 each carry two plates 15, which are located upon the two opposite vertical sides of the bar at the front end thereof, the said plates 15 of each bar 14 corresponding in all respects with the plates 8 of the bars 7, and said plates 15 being secured in position by horizontal through-bolts 16, with their usual nuts. The front ends of the bars 14 are detachably connected to the rear ends of the two bars 7 in the following manner: A double swivel (similar to the double swivels which are used at the front ends of the bars 7) is used to connect each of the rear ends of the bars 7 with the corresponding front ends of the bars 14. The vertical tubular members 12 of the swivels are interposed between the rearwardly-projecting ends of the two rear plates 8 of each of the front bars 7, while the horizontal tubular member 10 of each swivel is interposed between the projecting ends of the two plates 15 of the corresponding rear bar 14.

17 designates a bolt, which passes vertically through the projecting ends of the plates 8 and also loosely through the vertical tubular member of the corresponding swivel, there being thus two bolts 17, one at each side of the machine, and said bolts being elongated, so as to constitute teeth for the harrow.

18 designates the pin which detachably connects the bars 7 and 14, said pins extending horizontally through the forwardly-projecting ends of the plates 15 and loosely through the horizontal members 10 of the two swivels. Each of these pins 18 is retained removably in its described position by means of a linchpin 19, which is inserted removably into an opening 20, formed transversely through one end of the pin 18. It will be apparent that by withdrawing the linchpins 19 from the ends of the pins 18 and then drawing the pins 18 out of their described connection with the double swivels the front and rear bars 7 and 14 of the harrow-frame can be detached from each other. It will be further understood that we contemplate forming either the horizontal pins 18 or the vertical bolts 17 so as to be thus removable for permitting the described detachment of the bars 7 and 14 from each other, or that both of said pins and bolts may be thus made removable, as preferred.

21 designates two plates, which are located upon the opposite vertical sides of each of the bars 14 and which are secured in such position by through-bolts 22, the rear ends of said plates extending beyond the rear ends of the bars 14. Between the projecting ends of the plates 21 are located the horizontal members 10 of the two double swivels, which are similar in all respects to the swivels previously described. A bolt 23 passes horizontally through the projecting ends of each pair of plates 21, and also through the horizontal member 10 of each rear double swivel, and a vertical bolt 24 passes loosely through the vertical member 12 of each double swivel, also vertically through the ends of the rear cross-bars 5, before described.

25 designates two cross-bars, which are secured the one above and the other below the front center bar 1 by means of through-bolts 27. These cross-bars are preferably of metal and extend at right angles to the center bar 1 and to the rear of the front cross-bars 3, said cross-bars 25 being of less length than the front cross-bars 3, substantially as shown, and being located at about midway of the length of the bar 1.

26 designates a pair of cross-bars, which are similar in point of material and dimensions to the cross-bars 25 and which are secured the one above and the other below the center bar 2 by through-bolts 28. These two cross-bars 26 are located about midway of the length of the rear center bar 2 and extend at right angles to said center bar, as shown.

29 designates two inner frame-bars, which are preferably squared timbers. To the opposite vertical sides of each of these bars 29 are secured two plates 30, horizontal through-bolts 31 serving as the means for securing said plates in position and passing transversely through the ends of the bars 29 for this purpose.

The front ends of the bars 29 are connected to the outer ends of the cross-bars 25 by double swivels of substantially similar construction to the double swivels previously described, the manner of such connecting being as follows: The vertical members 12 of the double swivels are interposed between the ends of the cross-bars 25, while the horizontal members 10 of said double swivels are interposed between the forwardly-projecting ends of the plates 30. A vertical bolt 32 passes through the ends of the cross-bars 25 and also through the vertical members 12 of the double swivels, the said bolts being prolonged downward to form harrow-teeth. Horizontal bolts 33 also extend through the ends of the plates 30 and through the horizontal members 10 of the double swivels.

34 designates two bars, which are similar in form, material, and dimensions to the bars 29. At its rear end each of the bars 34 carries two plates 35, which are located at opposite vertical sides of the bar and which are secured in position by horizontal through-bolts 36. The rear ends of the bars 34 are connected to the outer ends of the cross-bars 26 by two double swivels similar to the double swivels previously described. Two vertical bolts 37 extend through the ends of the cross-bars 26 and also through the vertical members 12 of the double swivels, while two horizontal bolts 38 pass through the ends of the plates 35 and also through the horizontal members 10 of the double swivels. Two plates 39 are secured upon the rear end of each bar 29 at the opposite horizontal sides thereof, and are retained in position by through-bolts 40. Two similar plates 41 are secured upon the front end of each bar 34 at the opposite vertical sides thereof and are retained in position by through-bolts 42. The rear ends of the front bars 29 are connected to the front ends of the bars 34 by double swivels, which are similar in all respects to the double swivels before described, and the manner of such connection is as follows: The vertical members 12 of these double swivels are interposed between the rearwardly-extending ends of the plates 39, a pair of bolts 43 passing vertically through the ends of the plates and also through the vertical members of the double swivels and having their lower ends prolonged so as to constitute harrow-teeth. Horizontal pins 20 (similar in all respects to the pins 20, previously described) pass removably through the ends of the plates 41 and also through the horizontal members 10 of the double swivels, linchpins 19 being used, as before, to retain the pins 20 in position.

From the above description it will be seen that the double swivels permit the bars constituting the harrow-frame to rise and fall vertically, as indicated in dotted lines in Fig. 4, with perfect freedom, and thus enable the harrow-teeth to reach all parts of the soil, whether much depressed or elevated or comparatively level. It will be further seen that by removing the linchpins 20 the harrow-frame can be quickly separated into two sections, as shown in Fig. 5, and that these sections can be folded up into very compact form for transportation by wagon to and from the field or for storage. The double swivels also permit of a lateral contraction and a longitudinal elongation of the harrow-frame when the latter meets stumps or other obstructions, and this action will be presently more fully explained.

Upon the upper side of the front center bar 1, at the rear end thereof, is mounted a plate 43, which is retained in position by suitable vertical through-bolts 44 and which is provided at its rear end with an upturned hook 45, for a purpose to be presently explained.

The rear center bar 2 is provided with a longitudinal bore or channel 46, which extends throughout the length of the bar, and at the rear end of said bar, on the upper side thereof, is mounted a plate 47, having two obliquely outwardly and upwardly extending projections or cleats 48.

49 designates an elongated bar or rod having at its front end a hook 50, to which is connected a ring or link 51, which is normally connected to the hook 45, as shown. The rod or bar 49 extends through the bore or channel 46 of the rear center bar 2, and to the rear end of this rod or bar is connected one end of a chain 52 or a rope or other flexible connection, a similar hook 53 on the rear end of said rod or bar 49 and similar to the hook 50 on the front end of said bar being shown as passing through one of the links of the chain.

It is to be understood that normally the rod or bar 49 is drawn back so that its front end only protrudes beyond the front end of the rear center bar 2, as shown in Figs. 1 and 2, the chain 52 or other flexible connection being belayed upon the cleat 47. Now when the harrow approaches a stump or a rock or other obstruction which might injure the teeth or frame of the harrow or prevent the harrow from being drawn along farther the chain or other flexible connection is paid off from the cleat and the harrow-frame is permitted to contract laterally and elongate longitudinally, so as to clear the obstruction, the rod 48 being drawn forward through the bore or channel, as shown. By reference to the drawings it will be seen that the link or ring 51 is to be detached from the hook 46 when the two sections of the harrow-frame are separated for transportation or shipment.

By reference to Figs. 1, 2, and 3 it will be seen that the bars 7, 14, 29, and 34 each carry a number of downwardly-extending teeth 54, the cross-bars 3, 5, and 26 also carrying similar teeth, and it is to be particularly observed that the relative arrangement of the teeth is such that when the harrow-frame is adjusted for work the teeth on the bars 7 14 are in line with the spaces between the teeth on the bars 29 and 34, and that consequently every particle of the soil is stirred by the teeth. As shown, the harrow-frame is composed of an outer set of four bars and a single inner set of four bars; but two or more inner sets of said bars may be used, if preferred, without departing from the essential spirit of our invention.

In order to cause the draft to be applied properly to the harrow, we have provided the form of clevis shown. This clevis consists of a standard 55, having a number of holes 56 arranged in vertical series throughout its length. The lower end 57 of this standard extends rearward at right angles therefrom and is located immediately beneath the front end of the front center bar 1 of the harrow, any desired number of vertical through-bolts 58 serving to secure the end 57 in such position. From the upper end of the standard 55 extends obliquely rearward and downward an arm or brace 59, the lower end of which is enlarged to rest upon the upper side of the front center bar 1, and said enlarged end is formed with a hole 60 to receive the rear bolt 58, as shown.

61 designates a loop, through the end of which passes a bolt 62, the said bolt passing, also, through one of the holes 56 and being retained in position by a nut 63. Thus it will be seen that by inserting the bolt 62 through one or another of the holes 56 the draft can be caused to come more or less downwardly upon the harrow. This clevis is peculiarly desirable and necessary to this particular harrow, owing to the flexible character of its construction. Consequently there can never be an upward draft on the harrow which would lift its front portion entirely off of the ground; but the draft is, by virtue of the described construction of the harrow, always downward.

From the above description it will be seen that we have produced a harrow which is simple, durable, and inexpensive in construction and by means of which a most thorough stirring of the soil, however uneven, is effected, and which can also be readily divided for transportation, and, furthermore, which will automatically avoid obstructions.

Having thus described our invention, what we claim as new therein, and desire to secure by Letters Patent, is—

1. A harrow comprising a harrow-frame composed of a front section, a rear section detachably connected to the front section, a bar or rod sliding in the rear section and detachably connected to the front section, and a flexible connection attached to said rod or bar and detachably connected to the rear section, substantially as set forth.

2. A harrow comprising a front section, a rear section detachably connected to the front section, a longitudinal center bar for the front section, a tubular longitudinal center bar for the rear section, a rod or bar located within the tubular center bar and detachably connected to the rear end of the front center bar, and a flexible connection attached to the rear end of the rod or bar and detachably connected to the rear end of the rear center bar, substantially as set forth.

3. A harrow composed of a number of bars constituting the outer harrow-frame section, having relatively vertical and horizontal pivotal movements, and a number of similar bars constituting inner harrow-frame sections and having, also, relatively vertical and horizontal pivotal movements, the said bars being so connected as to form front and rear sections and said sections being detachably connected to each other, substantially as set forth.

In testimony whereof we affix our signatures in the presence of two witnesses.

AUGUST H. TESCHNER.
PAUL E. TESCHNER.

Witnesses:
MATHIAZ NOLL,
A. M. VETH.